(12) United States Patent  
Stanislaus et al.

(10) Patent No.: US 8,824,323 B2  
(45) Date of Patent: Sep. 2, 2014

(54) WIRELESS CONTROL PLANE FAILURE HANDLING IN A SPLIT-PLANE DEPLOYMENT

(75) Inventors: William Stanislaus, Fremont, CA (US); Seemant Choudhary, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 333 days.

(21) Appl. No.: 13/306,469

(22) Filed: Jan. 10, 2012

(65) Prior Publication Data

US 2013/0176859 A1 Jul. 11, 2013

(51) Int. Cl.  
*H04W 24/00* (2009.01)

(52) U.S. Cl.  
USPC ........................................................ 370/252

(58) Field of Classification Search  
USPC .......................................... 370/242, 351, 331  
See application file for complete search history.

(56) References Cited

U.S. PATENT DOCUMENTS

| | | | |
|---|---|---|---|
| 7,787,370 B1 | 8/2010 | Aweya et al. | |
| 7,813,267 B2 * | 10/2010 | Tsai et al. | 370/218 |
| 8,145,215 B2 * | 3/2012 | Olson | 455/434 |
| 2003/0097470 A1 | 5/2003 | Lapuh et al. | |
| 2004/0095942 A1 * | 5/2004 | Lung | 370/400 |

FOREIGN PATENT DOCUMENTS

| | | |
|---|---|---|
| EP | 1645087 A1 | 4/2006 |
| GB | 2465929 A1 | 6/2010 |
| GB | 2481665 A | 1/2012 |
| GB | 2485024 A | 5/2012 |
| GB | 2485026 A | 5/2012 |
| WO | WO2008043374 | 4/2008 |

OTHER PUBLICATIONS

UK Search Report from corresponding UK Application GB1217356.3 dated Jan. 30, 2013, pp. 1-4.

* cited by examiner

*Primary Examiner* — Mark Rinehart  
*Assistant Examiner* — Mohammad Anwar  
(74) *Attorney, Agent, or Firm* — Anderson Gorecki & Rouille LLP

(57) ABSTRACT

A method, apparatus and computer program product for providing wireless control plane failover handling in a split-plane deployment is presented. A first AP in a split-plane deployment detects failure of a Wireless Control Plane (WCP) device. The first AP hides an SSID in beacons broadcast by the first AP. The first AP stores information for existing Mobile Units (MUs) that dissociate after the detection of the failure of the WCP device. The first AP will respond to probes from existing MUs; and also respond to probes from MUs that have their information stored in the AP, such that the first AP appears hidden from new MUs while being exposed to existing MUs.

16 Claims, 17 Drawing Sheets

WIRELESS CONTROL PLANE FAILURE HANDLING IN A SPLIT-PLANE DEPLOYMENT

BACKGROUND

Wireless networks have become ubiquitous. A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or layer of the network.

A typical wireless network may include one or more Access Points (APs), one or more Wireless Controllers (WCs) and one or more Mobility Units (MUs). MUs can include laptops, cell phones, Personal Digital Assistants (PDAs) and the like.

Wireless Local Area Networks (LANs) are a popular and inexpensive way to allow multiple users of "mobile units" (MUs) to communicate with each other, to access a wired LAN, to access a local server, to access a remote server, such as over the Internet, etc. A wireless local area network (WLAN) typically includes an Access Point (AP) and one or more mobile units.

A wireless AP is a device that allows wireless communication devices to connect to a wireless network. The access point allows wireless mobile units to communicate with each other and to communicate with infrastructure connected to the AP.

A server is used to provide services, such as access to applications like an email system, a word processing program, an accounting system and/or a dedicated database. Wireless LANs are employed within such facilities as businesses, university classrooms or buildings, airport lounges, hotel meeting rooms, etc. When a user is physically located in the vicinity of an access point, the transceiver of the mobile unit communicates with the access point and a connection to the wireless LAN is established.

APs and mobile units transmit data in units referred to as frames over a shared-communications channel. Frames transmitted from a mobile unit to an AP are referred to as uplink frames, and frames transmitted from an AP to a mobile unit are referred to as downlink frames. In a situation where two or more mobile units (or an AP and a mobile unit) transmit frames simultaneously, then one or more of the frames can become corrupted, referred to as a collision. As a result, Wireless Local Area Networks (WLANs) typically employ one or more protocols to ensure that a mobile unit or AP can gain exclusive access to the shared-communications channel for a predetermined interval of time in order to transmit its frames without collisions occurring.

Certain wireless network protocols (e.g., Institute of Electrical and Electronics Engineers [IEEE] 802.11, etc.) provide for the AP to periodically broadcast a special frame called a beacon that can be heard by the mobile units in the BSA (basic service area), the area covered by the AP. The beacon contains a variety of information that enables the mobile units to establish and maintain communications in an orderly fashion, such as a timestamp, which enables mobile units to synchronize their local clocks, and signaling information (e.g., channel number, frequency hopping pattern, dwell time, etc.).

A wireless network may also include one or more Virtual Local Area Networks (VLANs). A VLAN includes a group of devices with a common set of requirements that communicate as if they were attached to the same broadcast domain, regardless of their physical location. A VLAN has the same attributes as a physical LAN, but allows for devices to be grouped together even if they are not located on the same network switch.

Split-plane deployment re-uses existing switching infrastructure components at a customer site for wireless data forwarding with the wireless control plane (WCP) functions implemented in a virtual or physical appliance within an enterprise data center. WCP functionality is responsible for configuration, control and monitoring of a wireless access medium. MU association, authentication and dissociation are handled by the WCP. The wireless switching plane (WSP) performs the repetitive but high-volume data forwarding actions.

Redundancy and failover are important aspects of a network deployment since network outages occur frequently due to administration errors or faults in hardware or software. Administrators require the capability to shutdown, move and restart the virtual WCP application according to their resource needs in the data center. The ability of the wireless network to operate during these transitions without impact to the wireless users is very critical for success of split-plane architecture.

The most common deployment model is the overlay solution where WCP and WSP functions are integrated into a single device called a Wireless Controller (WC). In this case, the failure of connection between AP and WC affects both control and data forwarding.

SUMMARY

Conventional mechanisms such as those explained above suffer from a variety of deficiencies. In the split-plane architecture, the failure of the WCP does not affect wireless data forwarding. This allows the AP(s) to continue to provide data forwarding service to the associated MU(s) and has been mentioned as one of the advantages of split-plane architecture in the past. Another commercial solution that solves the redundancy problem is to move the WCP functions into the AP(s) where most functions are executed in the AP and the controller is only performing configuration and monitoring which do not impact the normal operation of the wireless access. This is a completely different architecture and is popular for small scale deployments but does not scale well as the number of AP(s) increase. In general, WCP functions are computationally intensive and scale well when they are centralized on a powerful CPU whereas WSP function scale well with decentralization. This benefit is available only from split-plane architecture.

The current solutions proposed for the failover do not fully address the issues that can arise during the event of a failover. This issue is critical for viability of the proposed notion that the AP can continue to forward the data for a longer period of time without reestablishing connectivity with a WCP appliance in the split-plane model. The problem arises because the AP does not have access to WCP functions to support association for new or roaming MU(s) but it continues to announce its presence in the wireless environment by way of 802.11 beacons and probe responses to the new or roaming MU(s). As more and more time elapses with AP(s) in this state, more and more MU(s) start experiencing wireless service disruption.

The current solutions multiply the problem in deployments where cellular redundancy is built into the deployment by way of intelligent load-balancing of AP(s) across the WCP(s).

In this scheme, popular in overlay deployments, the neighbor AP(s) in RF domain are assigned to alternate WCP devices. So when a WCP appliance fails, there is always some AP in a given physical location in the enterprise which retains connection with a working WCP and provides complete WCP functions for MU(s). In the overlay deployments, the cellular redundancy provides faster recovery because once AP detects loss of connectivity with WC it shuts down the radio and the MU(s) can immediately roam to a neighboring AP that still provides radio service. In split-plane deployments the discussed solution while addressing the unimpaired data forwarding aspects have completely ignored the advantages of shutting the radio off for coverage recovery.

Embodiments of the invention significantly overcome such deficiencies and provide mechanisms and techniques that provide a split-plane failover mechanism such that advantages of the split-plane architecture are retained for the MU(s) that do not roam during failover while still allowing roaming MU(s) to receive service in wireless networks designed with cellular redundancy. The mechanism described in this invention can allow the affected AP(s) to operate for a longer duration without complete access to WCP functions.

In a particular embodiment of a method for providing wireless control plane handling in a split-plane deployment the method includes detecting, by a first Access Point (AP) in a split-plane deployment, failure of a Wireless Control Plane (WCP) device. The method further includes hiding an SSID of the first AP in beacons broadcast by the first AP and storing, in a cache of the first AP, information for existing Mobile Units (MUs) that dissociate after the detection of the failure of the WCP device. Additionally the method includes responding to probes from existing MUs and responding to probes from MUs having information in the cache, such that the first AP appears hidden from new MUs while being exposed to existing MUs.

Other embodiments include a computer readable medium having computer readable code thereon for providing wireless control plane handling in a split-plane deployment. The computer readable medium includes instructions for detecting, by a first Access Point (AP) in a split-plane deployment, failure of a Wireless Control Plane (WCP) device. The computer readable medium further includes instructions for hiding an SSID of the first AP in beacons broadcast by the first AP and instructions for storing, in a cache of the first AP, information for existing Mobile Units (MUs) that dissociate after the detection of the failure of the WCP device. Additionally the computer readable medium includes instructions for responding to probes from existing MUs and instructions for responding to probes from MUs having information in the cache, such that the first AP appears hidden from new MUs while being exposed to existing MUs.

Still other embodiments include a computerized device, configured to process all the method operations disclosed herein as embodiments of the invention. In such embodiments, the computerized device (e.g., an AP) includes a memory system, a processor, and a communications interface in an interconnection mechanism connecting these components. The memory system is encoded with a process that provides wireless control plane handling in a split-plane deployment as explained herein that when performed (e.g. when executing) on the processor, operates as explained herein within the AP to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing wireless control plane handling in a split-plane deployment as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1:
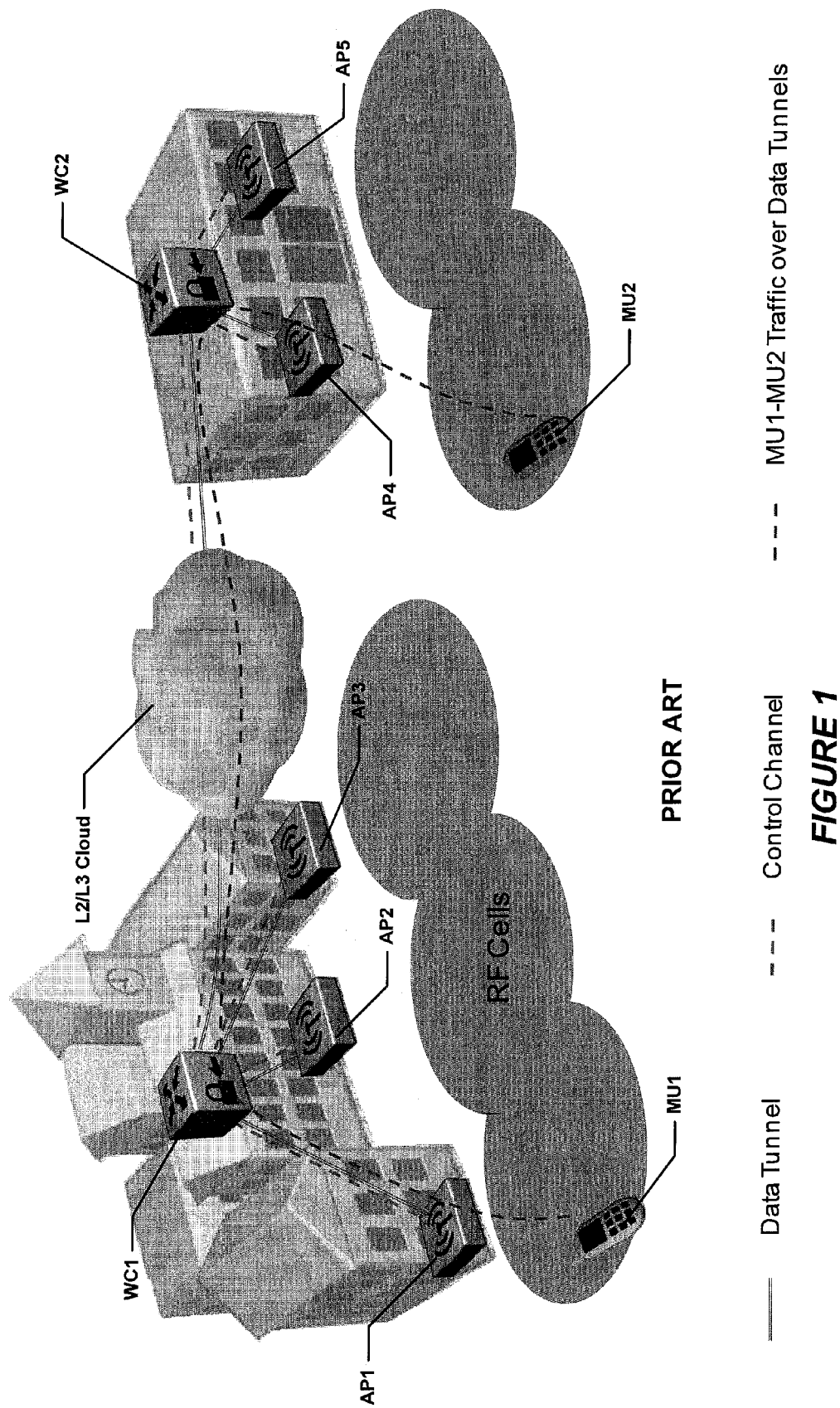
FIG. 1 is a block diagram depicting a prior art overlay model deployment.

The overlay architecture model is the commonly used wireless network deployment model. In this case wireless control plane (WCP) and wireless switching plane (WSP) are on the same device called a wireless controller (WC). Referring to FIG. 1, an overlay architecture model is shown. In this example a first building includes a first wireless controller WC1. The solid lines between devices represent data tunnels, the light colored dashed lines represent control channels and the darker dashed lines represent data traffic over data tunnels. Control channels are established between WC 1 and AP1, AP2 and AP3 respectively. Control channels are also established between WC2 and AP4, AP5 and WC1 respectively. Data tunnels are established between WC1 and AP1, AP2 and AP3 respectively. Data tunnels are also established between WC2 and AP4, AP5 and WC1 respectively. Data traffic between MU1 and MU2 takes place from MU1 to AP1, from AP1 to WC1, from WC1 over the L2/L3 cloud to WC2, from WC2 to AP4 and from AP4 to MU2.

Figure 2:
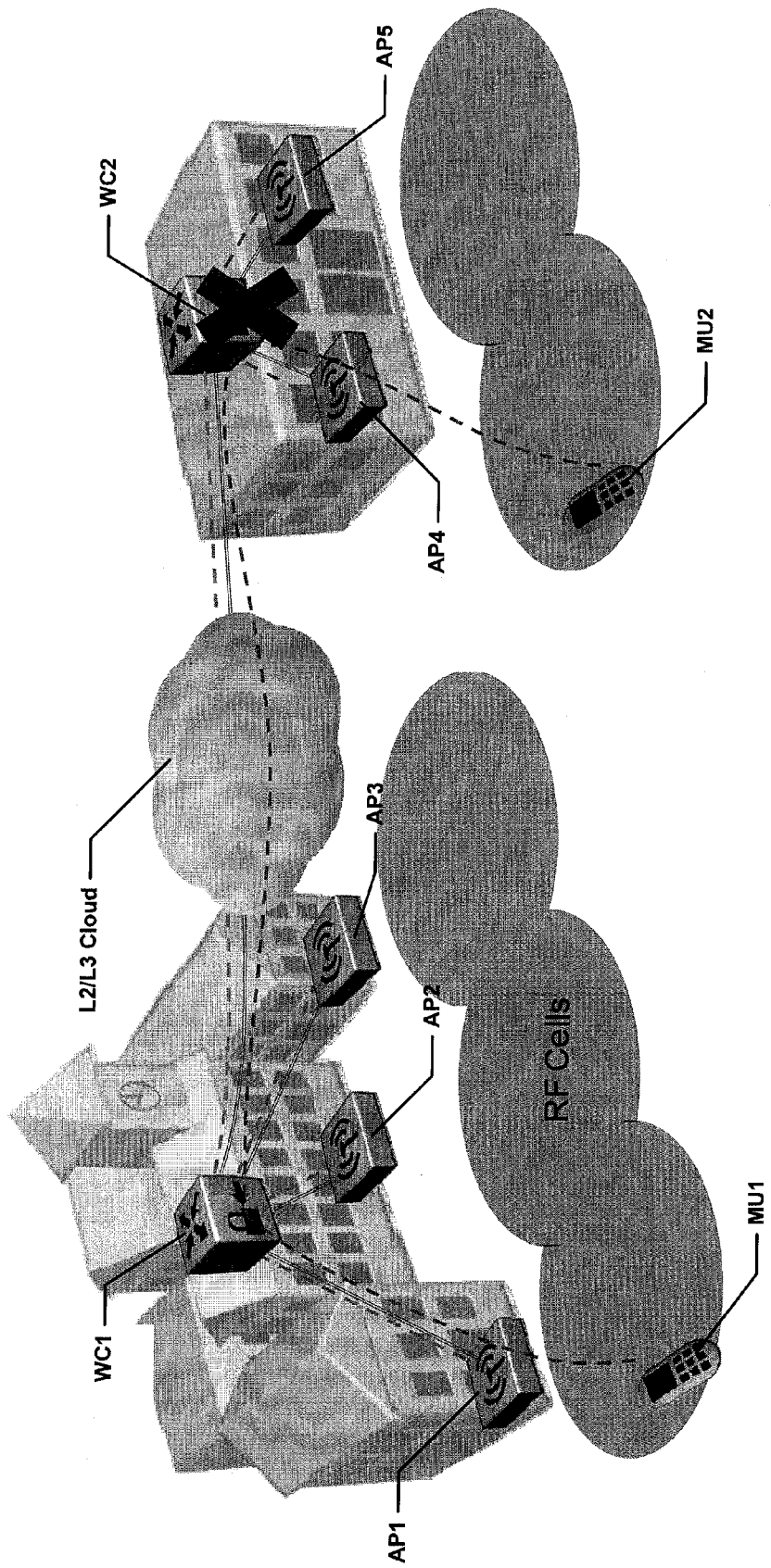
FIG. 2 is a block diagram depicting a prior art overlay model deployment wherein a wireless controller has failed.
Figure 3:
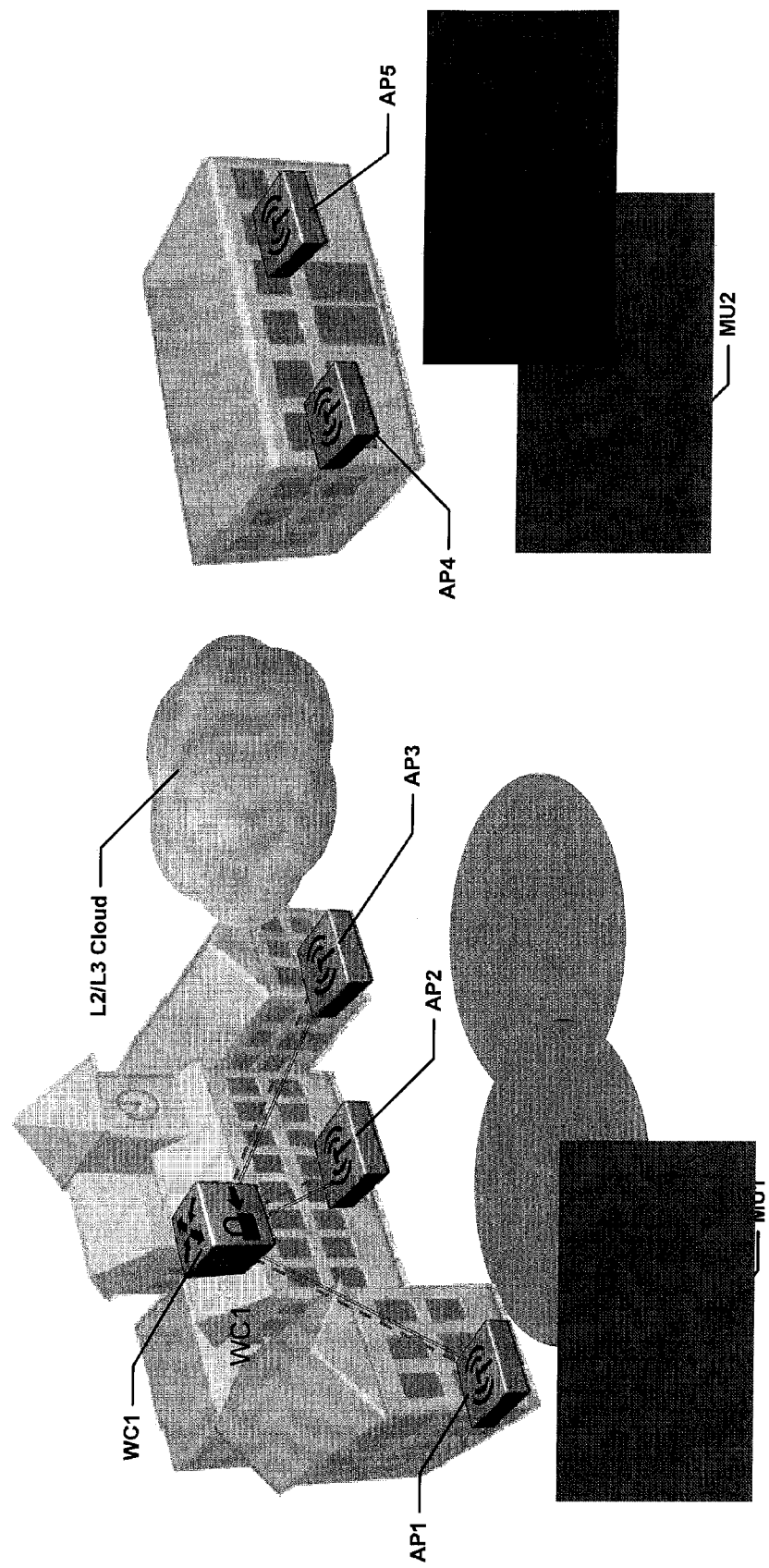
FIG. 3 is a block diagram depicting a prior art overlay model deployment wherein Access Points shut down their radios.
Figure 4:
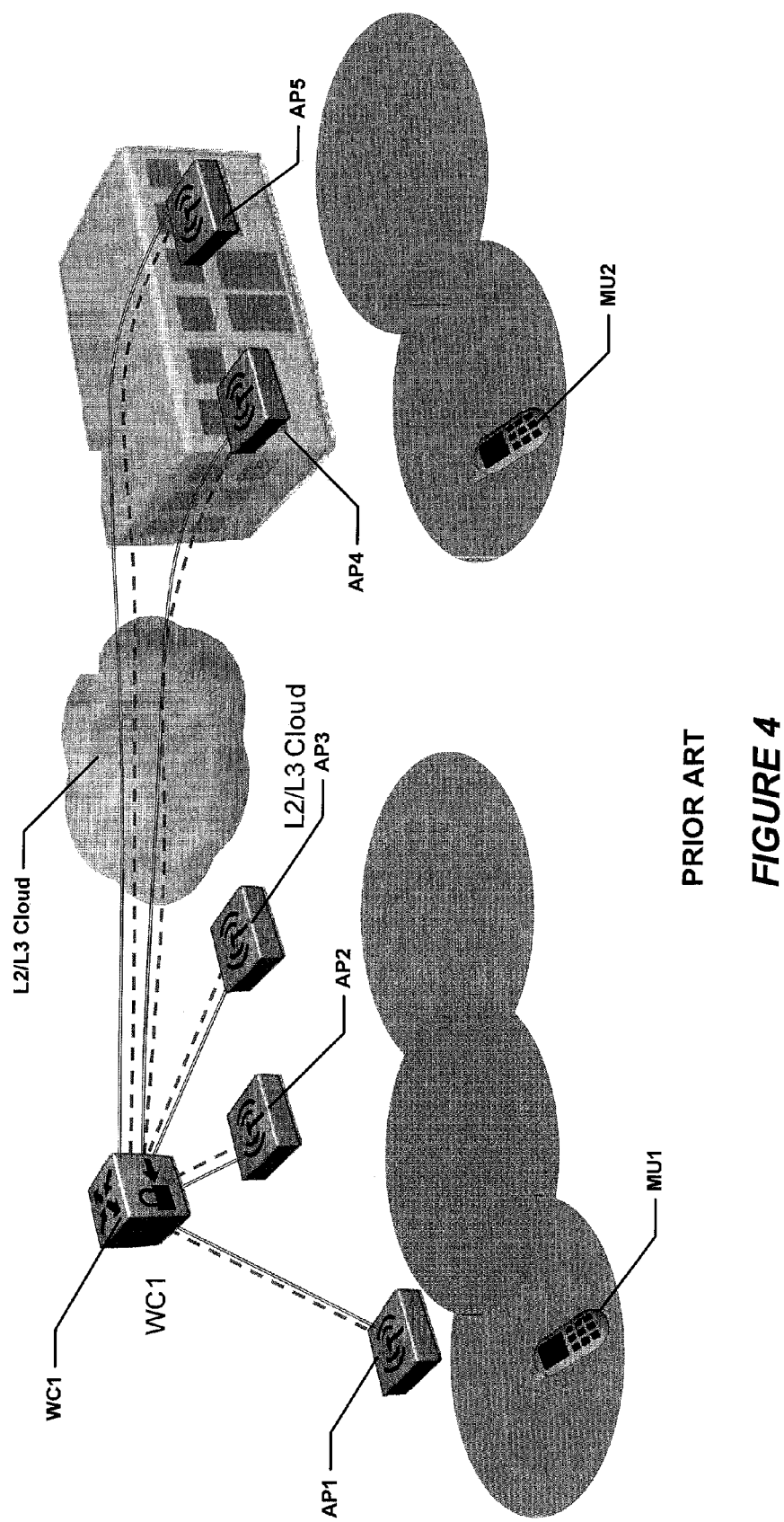
FIG. 4 is a block diagram depicting a prior art overlay model deployment wherein Access Points associate with another wireless controller and start providing Radio Frequency (RF) service.

Referring now to FIG. 2, WC2 has failed. As a result of WC2 failing, both the wireless control and wireless switching functions are no longer working. The MU1-MU2 connection is broken. AP4 and AP5 detect the failure of WC2 sometime after the actual failure. As shown in FIG. 3, AP4 and AP 5 shut down their radios. MU2 is dissociated since radios in its RF neighborhood are down. AP4 and AP5 attempt to discover another wireless controller in the mobility domain. As shown in FIG. 4, AP4 and AP5 discover WC1 and establish a data tunnel with WC1. AP4 and AP5 also establish a control channel with the newly discovered WC1. AP4 and AP5 then turn on their radios and provide RF service. MU2 can then associate with the wireless network again and can re-establish communications with MU1.

As shown in FIGS. 2-4, the WCP and the WSP fail simultaneously. The AP detects the failure with some delay, however data flow for MU(s) on the AP is interrupted immediately. The AP turns off the radio after it detects WCP and WSP failure, dissociating the MU(s). The AP discovers another WCP and WSP device and establishes control and data tunnels with the device. The AP turns on the radio and accepts the MU(s) again. Data forwarding for MU(s) is disrupted for a longer duration. Many wireless devices that are not mobile will not be able to get service until AP recovers connections with WCP and WSP device.

Figure 5:
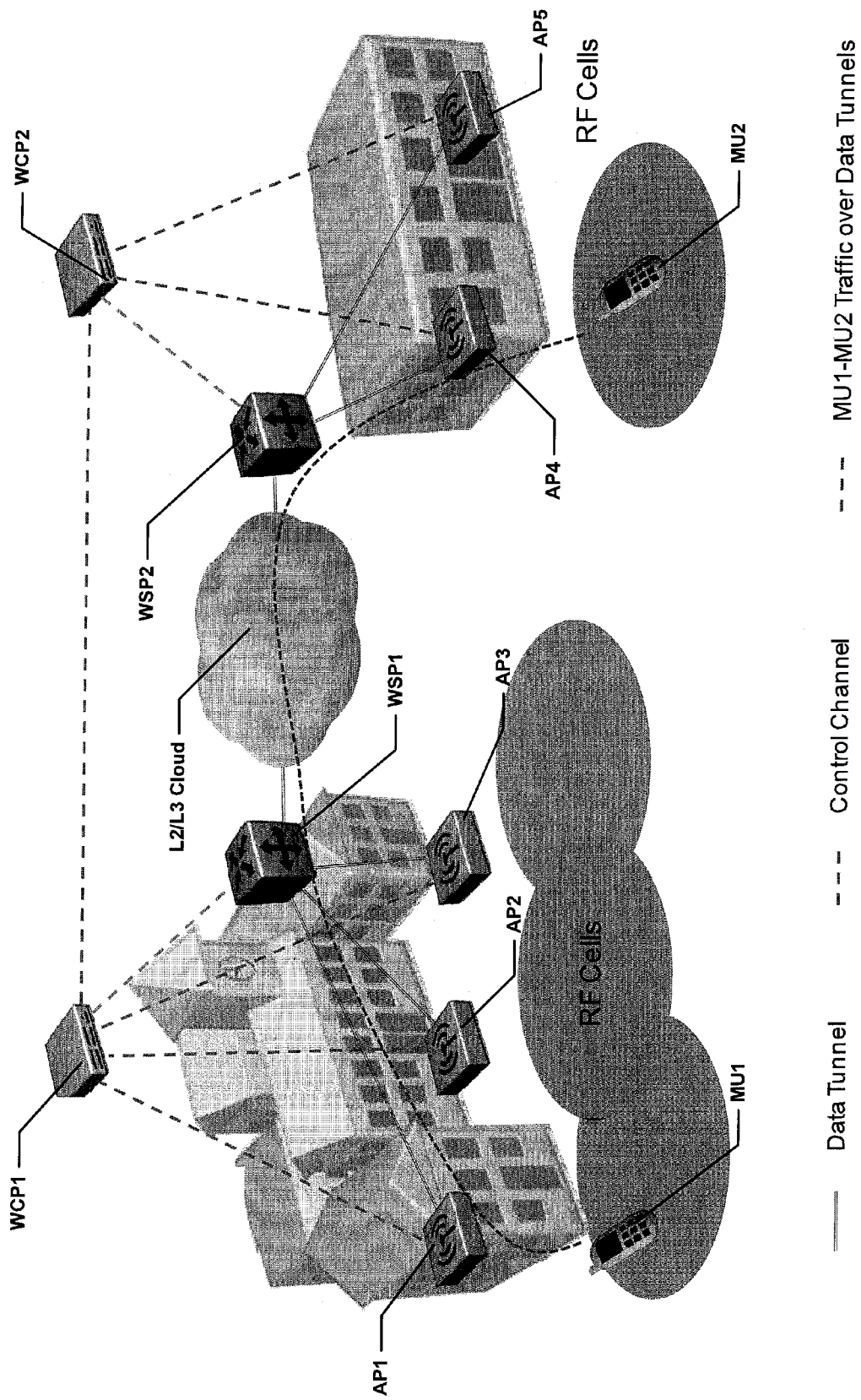
FIG. 5 is a block diagram depicting a prior art split-plane model deployment.

The split-plane architecture decouples wireless control plane (WCP) functions from wireless switching (WSP) functions. WCP function can be implemented in a virtual appliance or on real hardware. One of the proposed advantages of split-plane deployment model is it has potential to allow WCP to fail without affecting data forwarding for the existing clients. Referring to FIG. 5, a split-plane architecture model is shown. In this example a first building includes a first wireless control plane device (WCP1). Respective control channels are established between WCP1 and AP1, AP2, AP3 and WSP1. Control channels are also established between WCP2, and WCP1, AP4, AP5 and WSP2 respectively. Data tunnels are established between WSP1 and AP1, AP2 and AP3 respectively. Data tunnels are also established between WSP2 and AP4, AP5 and WSP1 respectively. Data traffic between MU1 and MU2 traverses from MU1 to AP1, from AP1 to WSP1, from WSP1 over the L2/L3 cloud to WSP2, from WSP2 to AP4 and from AP4 to MU2.

Figure 6:
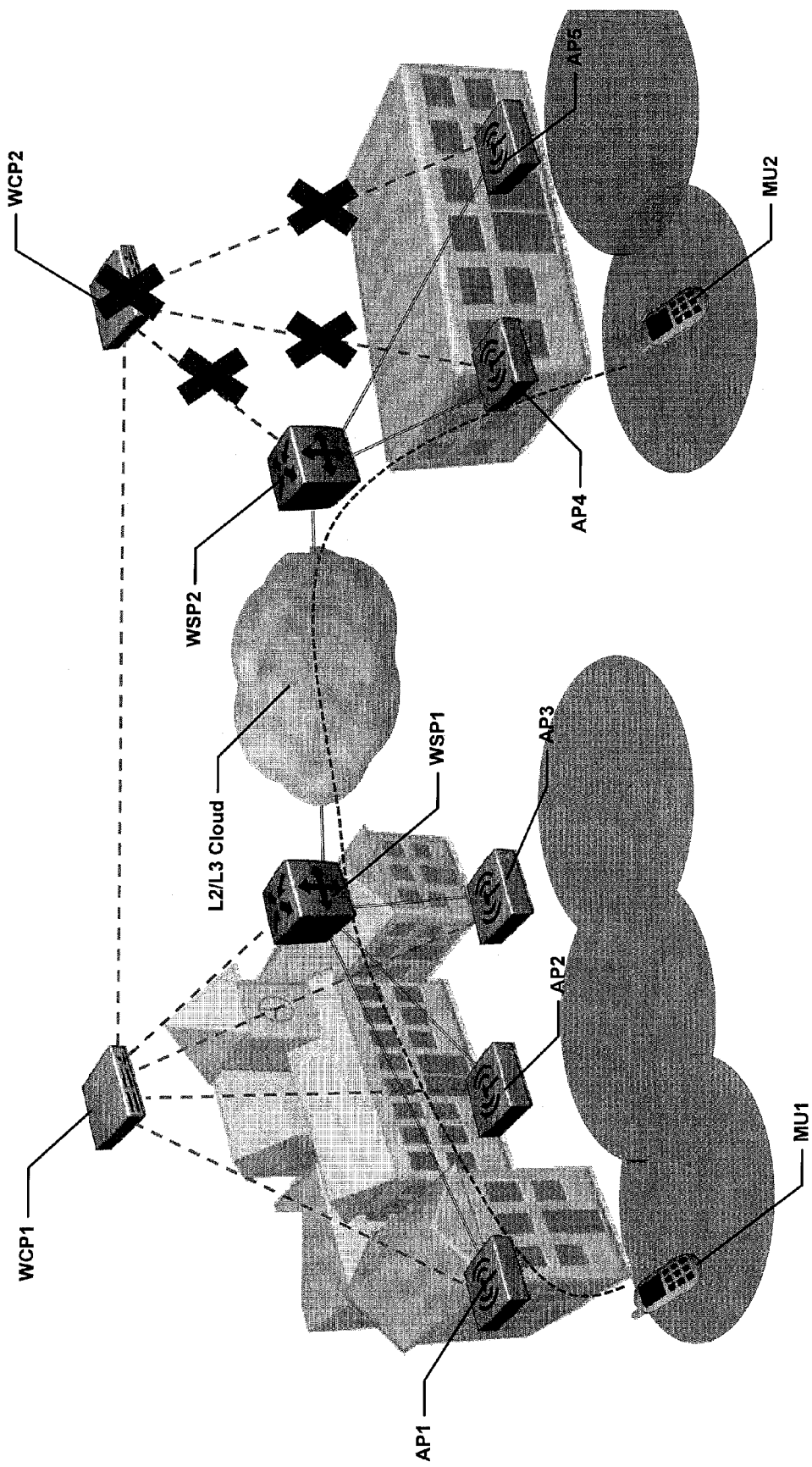
FIG. 6 is a block diagram depicting a prior art split-plane model deployment wherein a wireless control plane device has failed.

Referring now to FIG. 6, WCP2 has failed. Even though WCP2 has failed the MU1-MU2 connection is not broken. AP4 and AP5 are able to maintain their data tunnels with WSP2 and do not shut down their radios.

Figure 7:
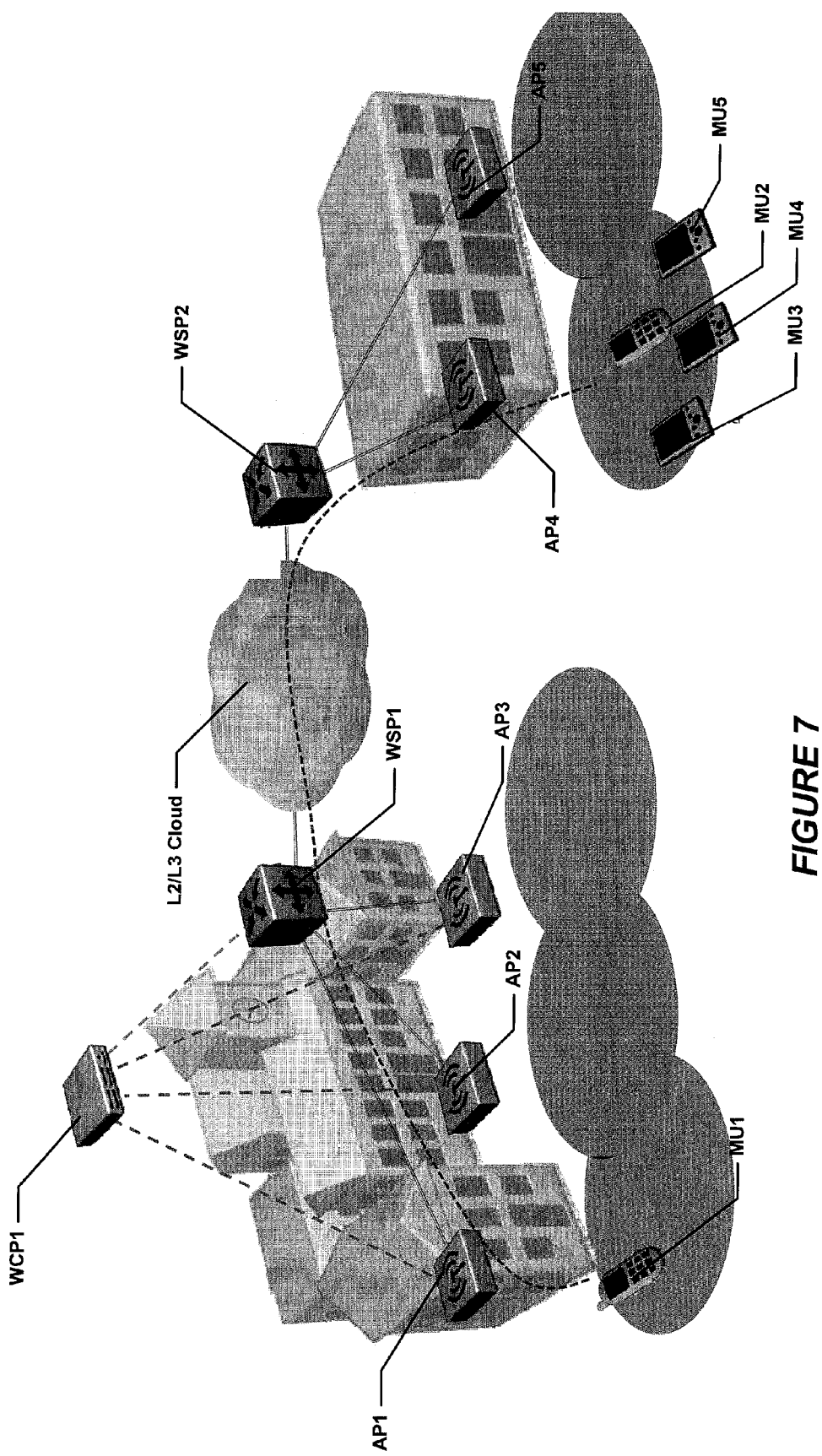
FIG. 7 is a block diagram depicting a prior art split-plane model deployment wherein a wireless switching plane device searches for another wireless control plane device but continues to forward data traffic for AP(s). The AP(s) that have lost connectivity with the WCP continue to operate with radio(s) on providing service to associated MU(s). However, new MU(s) cannot get service because AP(s) do not have WCP connectivity to complete the association for the new MU(s)
Figure 8:
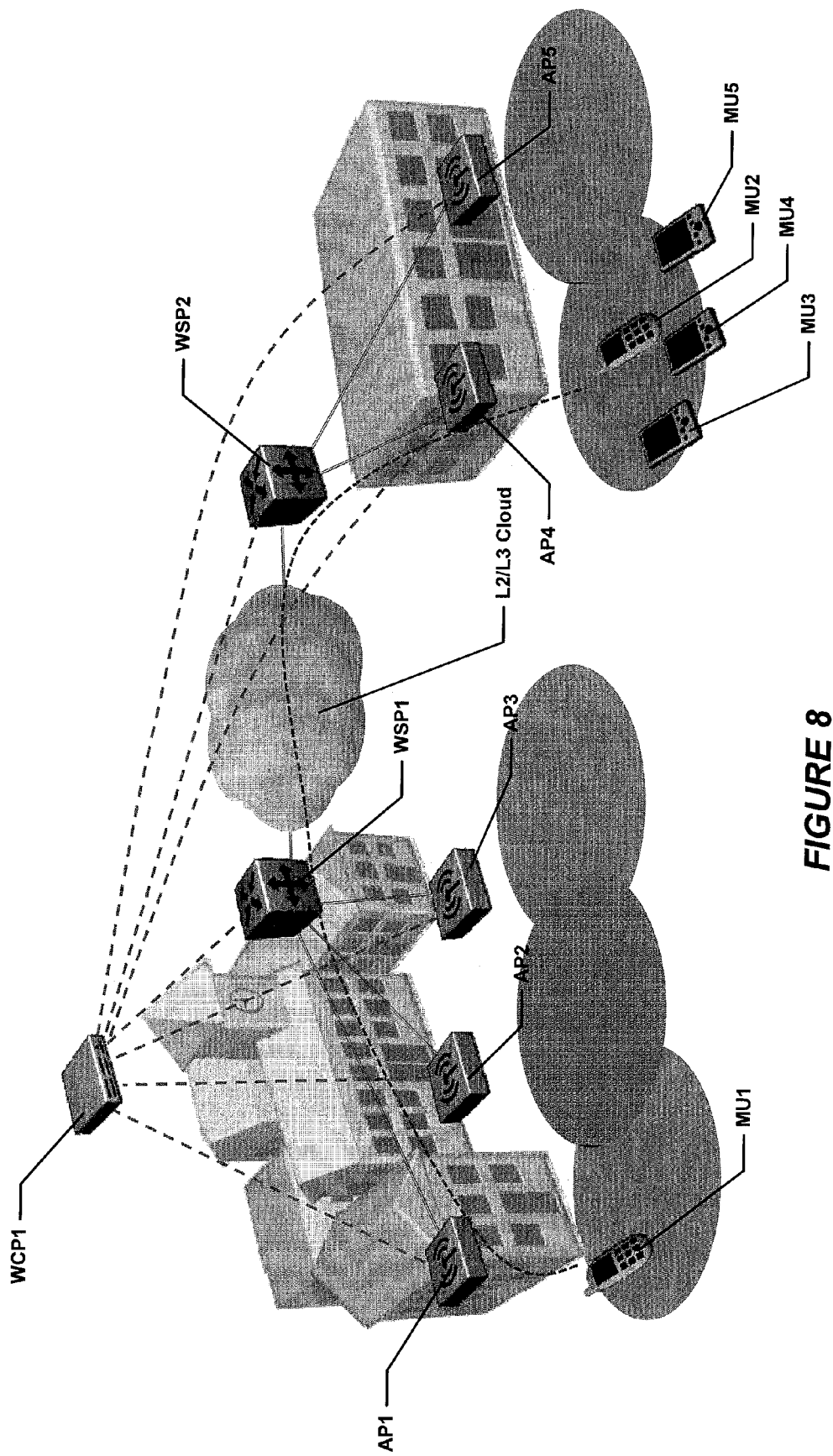
FIG. 8 is a block diagram depicting a prior art split-plane model deployment wherein a wireless switching plane device as well as AP(s) have associated with another WCP and recover full service for all MU(s)

As shown in FIG. 7, WSP2 detects the failure of WCP2 and searches for another WCP device. AP4 and AP5 detect the failure of WCP2 and attempt to discover another WCP device. The data tunnels between AP4 and WSP2 and between AP5 and WSP2 continue to stay up and carry wireless data. Radio cells stay operational but new clients or roaming devices (e.g., MU3, MU4 or MU5) cannot associate since association is a WCP function. Referring now to FIG. 8, WSP2 discovers WCP1 and establishes a control channel therewith. AP4 and AP5 also establish a respective control channel with WCP1. As a result, new or roaming devices such as MU3, MU4 and/or MU5 can now acquire service.

Figure 9:
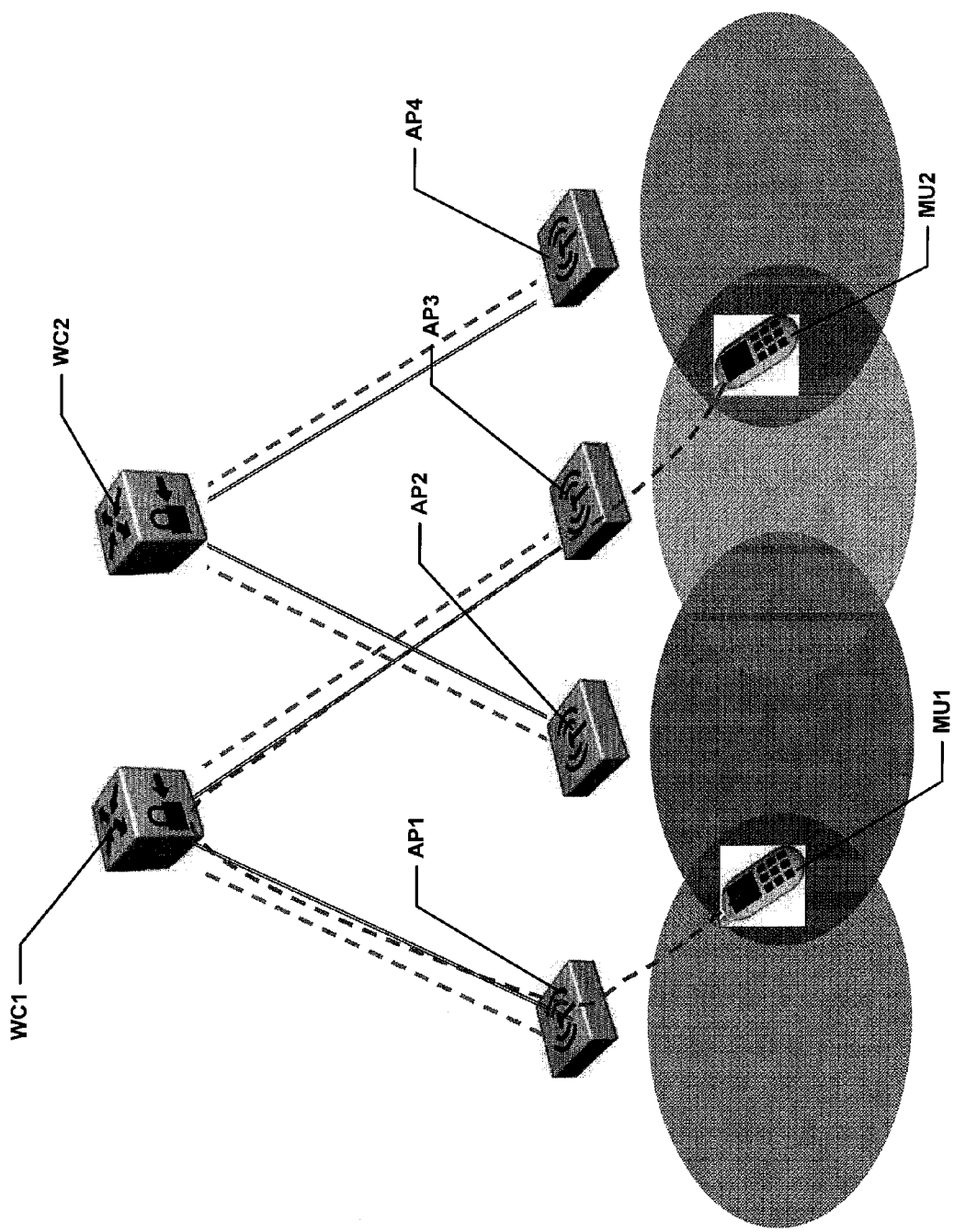
FIG. 9 is a block diagram showing the use of cellular redundancy in an overlay deployment.
Figure 10:
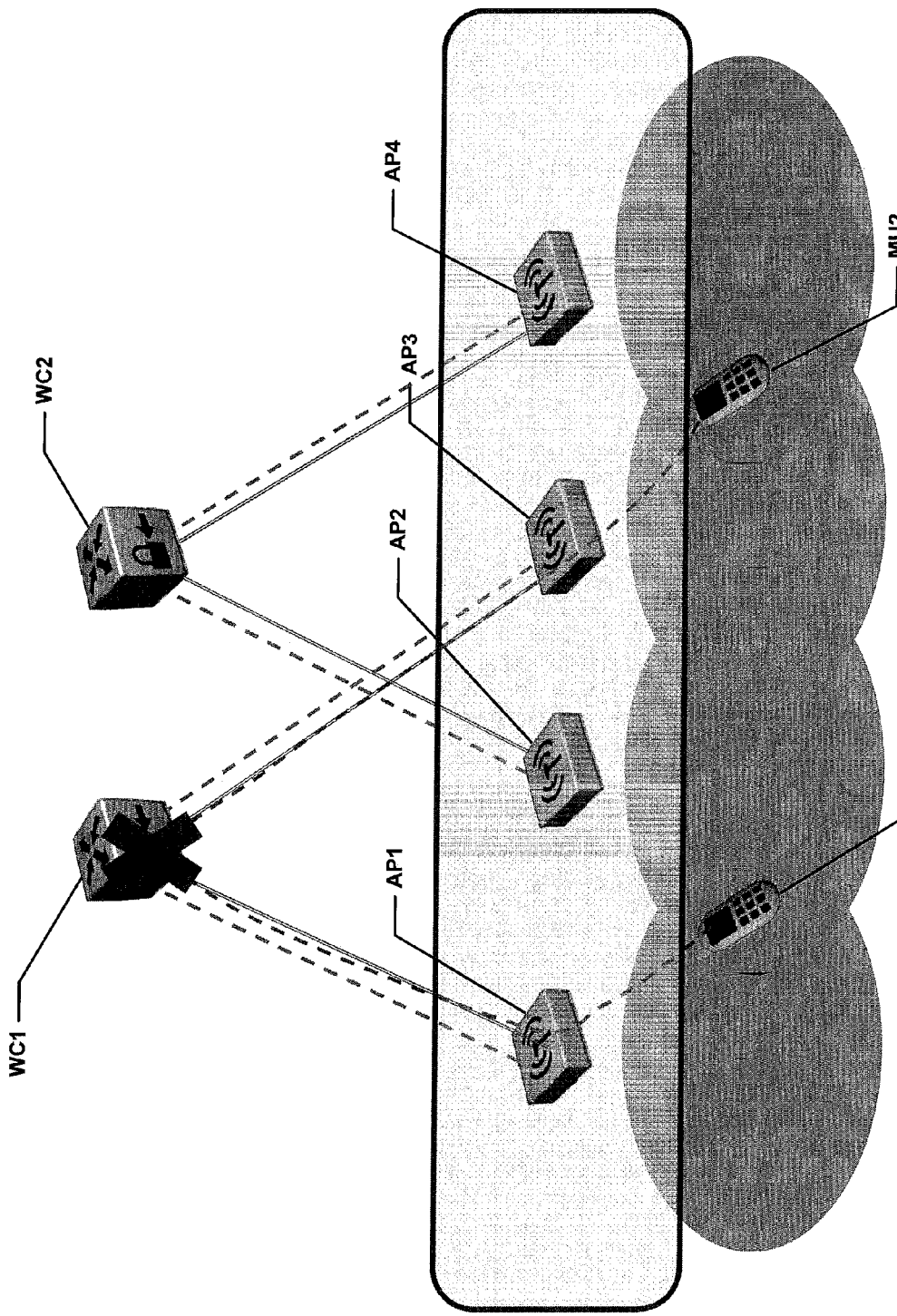
FIG. 10 is a block diagram showing the use of cellular redundancy in an overlay deployment wherein a wireless controller has failed.
Figure 11:
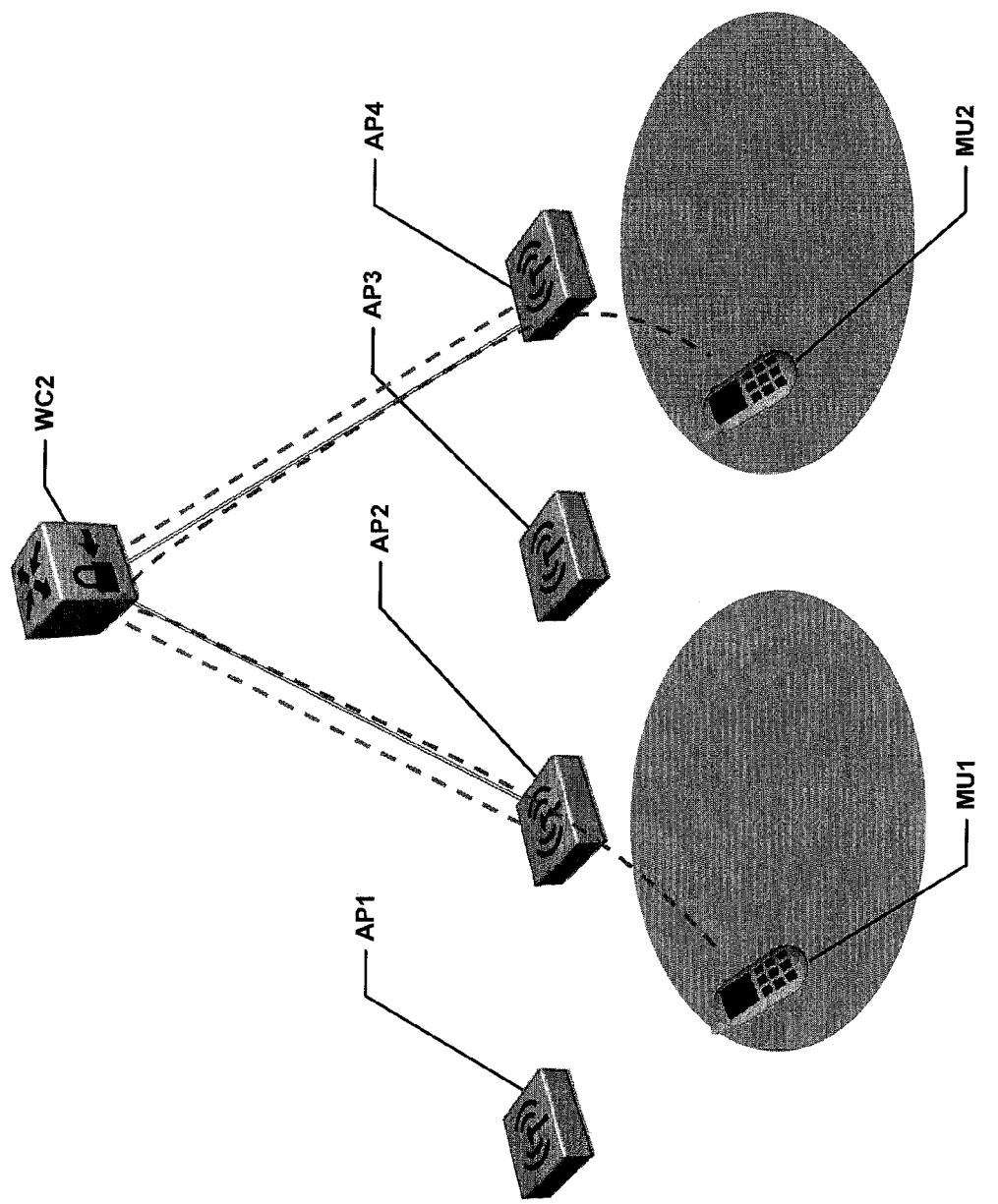
FIG. 11 is a block diagram showing the use of cellular redundancy in an overlay deployment wherein upon failure of a wireless controller, the AP(s) managed by the WC shut off the radio and the affected MU(s) roam to a neighbor access points that have the connectivity to another WC and announce the WLAN service in the RF domain

Cellular redundancy is achieved by designing the network such that neighboring AP(s) are managed by different WCP(s). Cellular redundancy can be achieved by AP-WC load-balancing algorithms and ensure that in the event of WCP failure not all AP(s) in a building or a floor stop providing service. Referring now to FIG. 9, an example cellular redundancy in overlay deployment is shown. AP1 has established a control channel and a data tunnel with WC1 and MU1 is associated to AP1. AP2, which neighbors AP1 and AP3, has established a control channel and a data tunnel with WC2. AP3 has established a control channel and a data tunnel with WC1 and MU2 is associated to AP3. AP4, which neighbors AP3, has established a control channel and a data tunnel with WC2. When a WC fails (e.g., WC1 in FIG. 10) both data and control channel from AP(s) terminating on the failed WC are affected. As shown in FIG. 11, the prior existing data tunnel and control channel between AP1 and WC1 and the prior existing data tunnel and control channel between AP3 and WC1 have been broken. Traffic from MU1 and MU2 is affected immediately upon the failure of WC1. AP1 and AP3 will shut down their radio when they detect the WC 1 failure. After AP 1 and AP3 have shut down the radios, MU1 and MU2 will immediately roam over to the neighboring AP(s) that continue to provide wireless service. MU1 will establish network connectivity with AP2 and MU2 will establish network connectivity with AP4.

Cellular redundancy in overlay provides faster recovery of wireless connectivity in the event of WC failures than without cellular redundancy. Distributing AP(s) to alternate WC(s) also distributes the WSP function to alternate WC(s). This may not be desirable in cases where the alternate WC(s) are not optimally located from data forwarding view point (e.g. WC(s) are located in geographically separate buildings)

Figure 12:
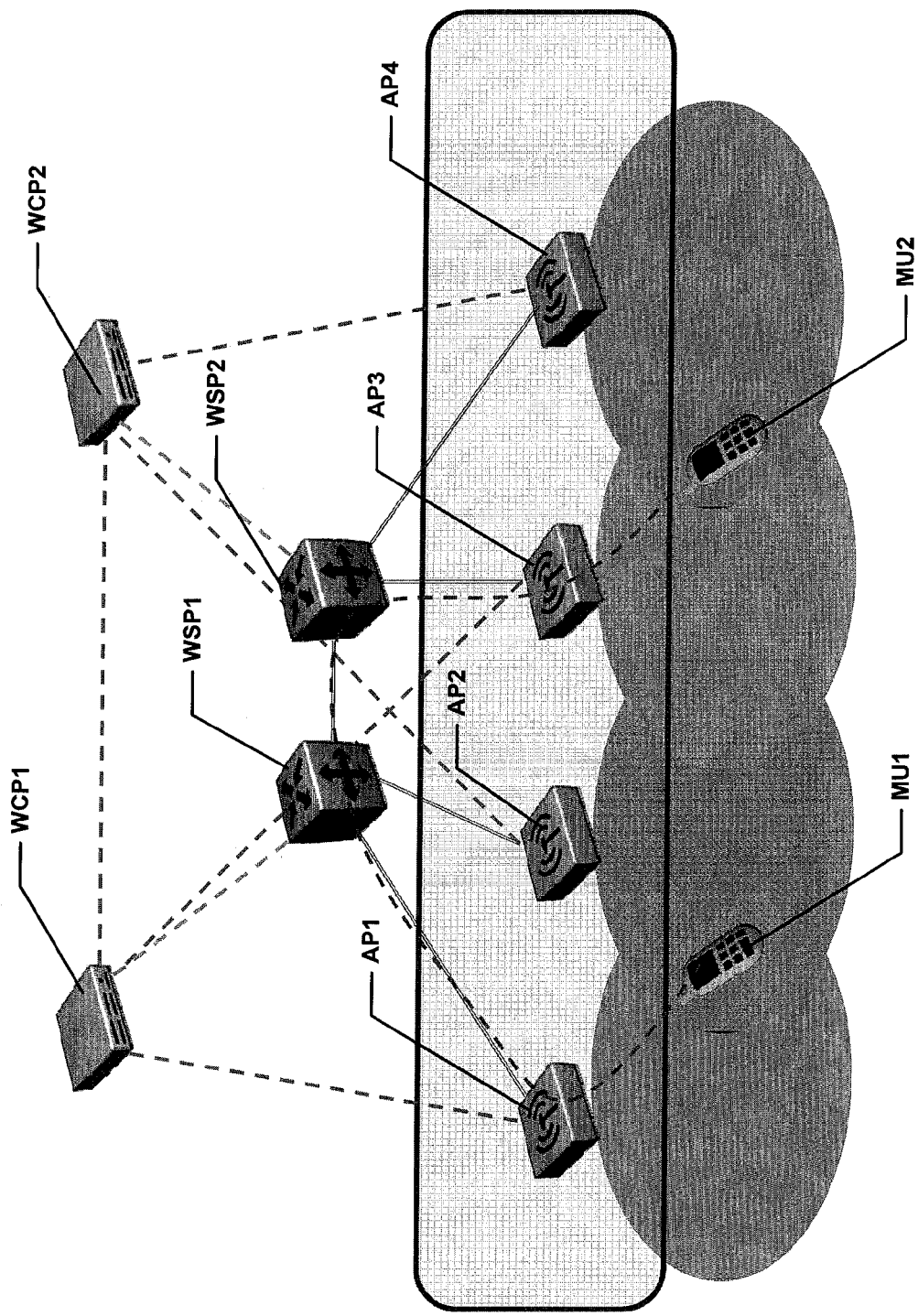
FIG. 12 is a block diagram showing the use of cellular redundancy in a split-plane deployment.

Cellular redundancy is used in overlay deployment model but its use in split-plane model has challenges. Referring to FIG. 12, a network incorporating cellular redundancy within a split-plane deployment is shown.

AP1 has established a control channel with WCP1 and a data tunnel with WSP1 and MU1 is associated to AP1. AP2, which neighbors AP1 and AP3, has established a control channel with WCP2 and a data tunnel with WSP1. AP3 has established a control channel with WCP1 and a data tunnel with WSP2 and MU2 is associated with AP3. AP4, which neighbors AP3, has established a control channel with WCP2 and a data tunnel with WSP2. WCP1 also has a control channel with WCP2 and with WSP1. WCP2 has a control channel with WSP2. A data tunnel also exists between WSP1 and WSP2. MU1 communicates with MU2 through AP1, WSP1, WSP2, and AP3. In this environment, AP neighbors are managed by different WCP devices.

Figure 13:
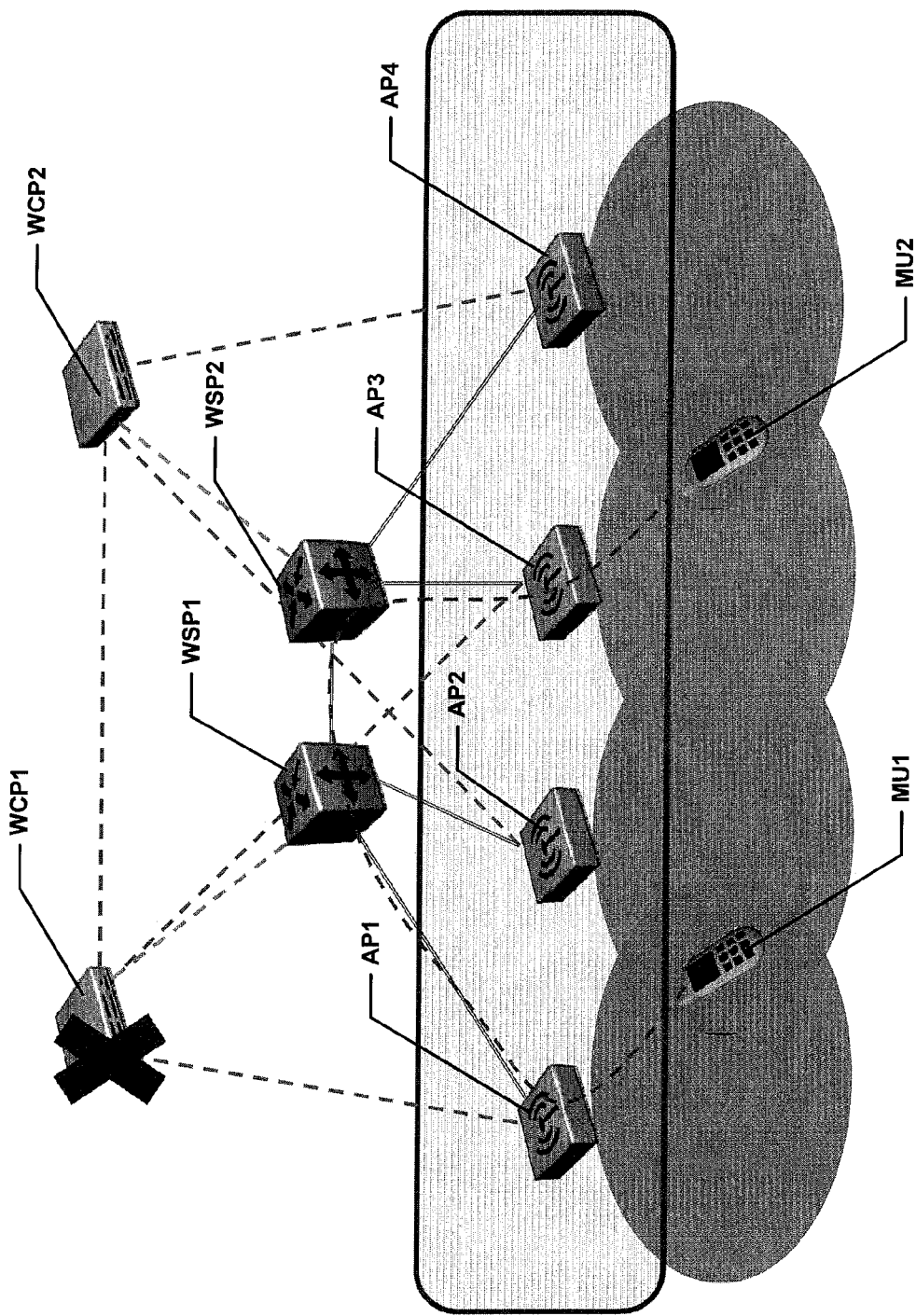
FIG. 13 is a block diagram showing the use of cellular redundancy in a split-plane deployment wherein a wireless control plane device has failed.
Figure 14:
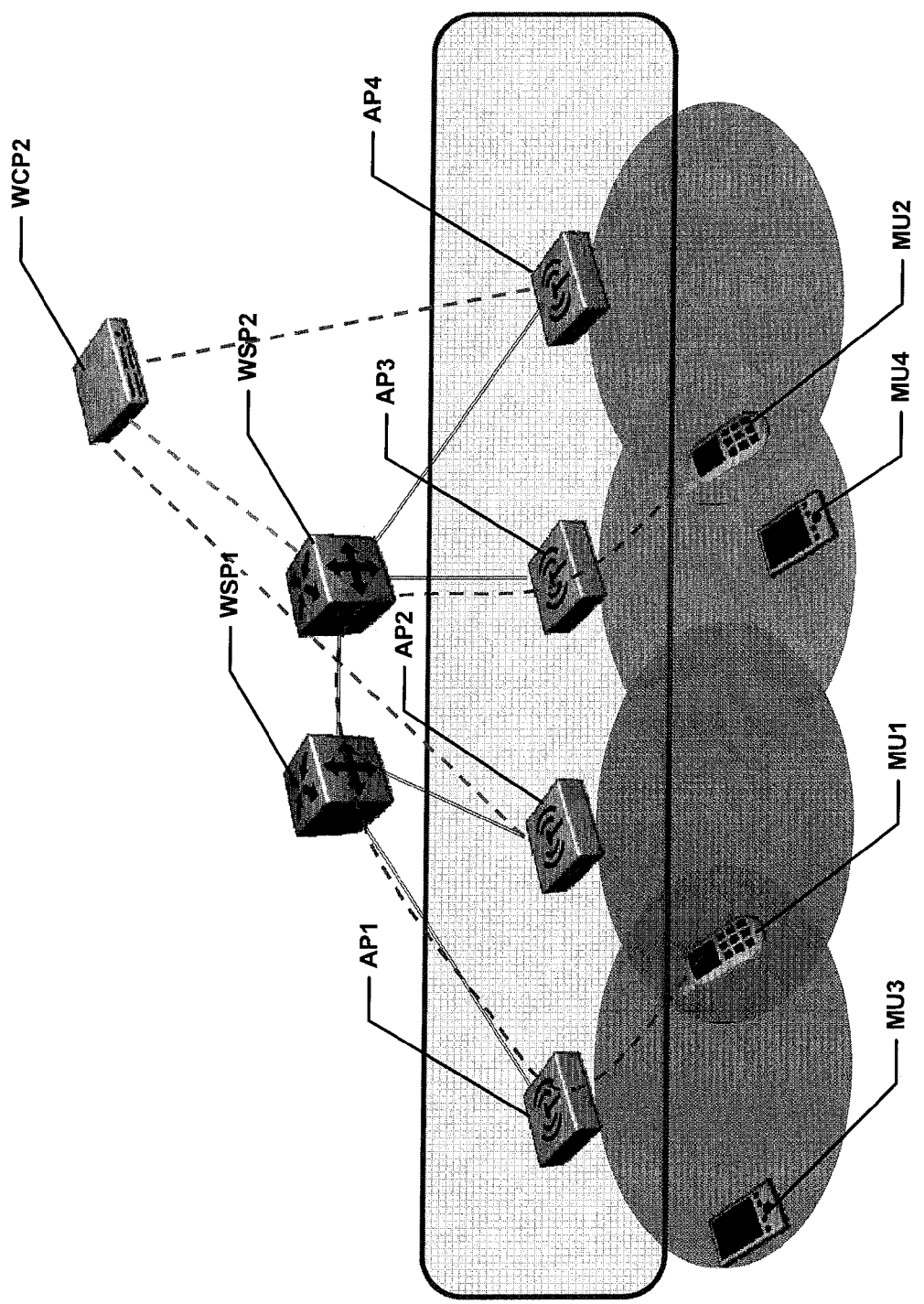
FIG. 14 is a block diagram showing the use of cellular redundancy in a split-plane deployment wherein a wireless control plane device has failed and wherein new clients do not receive service in AP cells that are not managed by any WCP.

When a WCP fails (e.g., WCP1 in FIG. 13) the control channels with the WCP are broken. MU data traffic is not affected in the split-plane model. In split-plane deployments affected AP(s) do not shut down the radio. New clients roaming into the affected AP cells will experience WLAN service disruption because the affected AP(s) do not provide access to WCP function. Existing clients in the affected AP cell will be disconnected if they momentarily roam to neighbor cells and come back. The split-plane failover mechanism requires enhancements to support cellular-redundancy because the affected AP(s) do not shut down the radios The presently described split-plane solution avoids turning the radio down on affected AP(s) allowing the AP cell to retain WSP functions for existing MU(s). Leaving the radios on attracts new devices to roam to the affected AP. Since new devices cannot complete association on the affected AP(s) due to unavailability of WCP function from the AP, any freshly roamed device into the affected AP cell will experience service disruption. For example, in FIG. 14, MU3 and MU4 will not be able to complete association and will experience service disruption.

MU(s) that are on the overlapping regions of two cells tend to roam frequently between cells. So some MU(s) in the affected AP cells may roam back and forth. There is no known mechanism for split-plane deployments that provides cellular redundancy for roaming clients and provides uninterrupted services for the stationary clients in the affected AP cells.

By way of the presently described method and apparatus for wireless control plane handling in a split-plane deployment, when an AP detects failure of WCP in split-plane deployments the AP takes the following actions. The AP will hide SSID broadcast in the AP beacons. The SSID is the name of a WLAN network with which MU(s) associate. The AP will further cache the association information for MU(s) that dissociate after WCP failure event and before AP has established connectivity with another WCP. The AP responds to probes from only existing MU(s) or from those MU(s) whose association information is cached. When a new MU roams near the affected AP cell, it will not be able to detect the SSID in the beacons from the affected AP since the affected AP hides the SSID in beacons. When a new MU probes on the channel of the affected AP cell, it will not get any response from the affected AP. Because a new MU cannot detect the affected AP either from active or passive scanning it will not get attracted to this affected AP and will attempt to join only those AP(s) that are visible to it. This mechanism retains cellular redundancy for new MU(s) in split-plane failover scenarios.

When an existing MU roams to a neighbor AP it will get connectivity on the neighbor AP due to cellular redundancy. When an existing MU roams back to the affected AP, the affected AP will be visible to this MU because this MU will get responses to probes from the affected AP. The affected AP can accept the MU based on previously cached information.

In deployments designed with cellular redundancy it is possible for the affected AP to receive access to WCP functions using AP-AP wireless distribution system (WDPS) with neighboring AP. This can be used to extend the WLAN service on affected AP(s) to new MU(s) also. The access to WCP function should be secured because it is used to relay sensitive association data of MU to WCP. The control channel between AP and WCP is encrypted. For an AP to get secured access to WCP functions over a WDS link with neighbor AP, the WDS link should also be encrypted. For WDS link security, all AP(s) receive a pre-shared encryption key from a WCP in the mobility domain when they establish connectivity with WCP. This pre-shared encryption key may be periodically modified and pushed to all AP(s).

AP(s) announce a WDS service in their RF neighborhood to support access to WCP functions for neighbor AP(s) that have lost connection to WCP. When the WCP fails, the affected AP(s) continue to provide service to existing clients in accordance with mechanism discussed in this invention earlier. The affected AP(s) stop announcing WDS service in their neighborhood while the unaffected AP(s) continue to announce the WDS service. The affected AP(s) also scan their RF neighborhood to determine any neighbor AP(s) that are announcing the WDS service. Once a neighbor working AP is determined, the affected AP establishes a temporary WDS link with the working AP for obtaining access to the WCP functions via the working AP. When a new MU associates with the affected AP, the affected AP sends the request to WCP via the WDS link with a working AP.

Because the AP(s) are providing service on all of the radios it is possible that the affected AP tunes only for brief interval to send requests to the WCP via the neighbor AP. When the response arrives from the WCP the neighbor AP can tune to the operating channel of the affected AP and forward the response to the affected AP. This ensures that both affected and working AP(s) continue to provide service to the MU(s) in their RF neighborhood with only small airtime spent in communicating with the WCP via neighboring AP The presently described method and apparatus for providing wireless control plane handling in a split-plane deployment allows full cellular redundancy in split-plane deployments while retaining the WCP failover benefits of split-plane. Additionally, the presently described method and apparatus allows affected AP(s) to operate for a longer duration without access to WCP functions and supports connectivity for both roaming MU(s) and stationary MU(s) during failover.

Figure 15A:
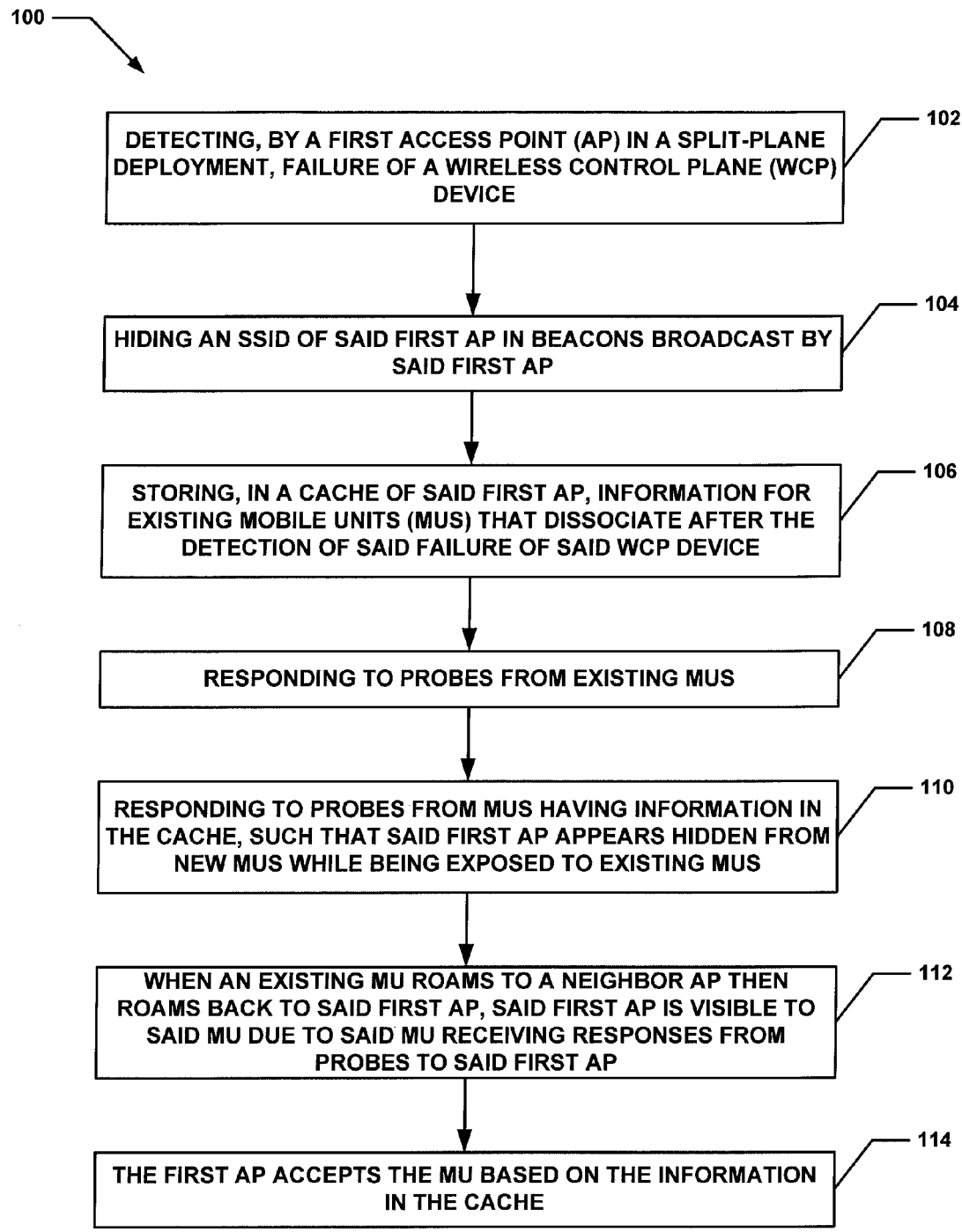
FIGS. 15A and 15B are a flow diagram of a particular embodiment of a method for providing wireless control plane failover handling in a split-plane deployment.
Figure 15B:
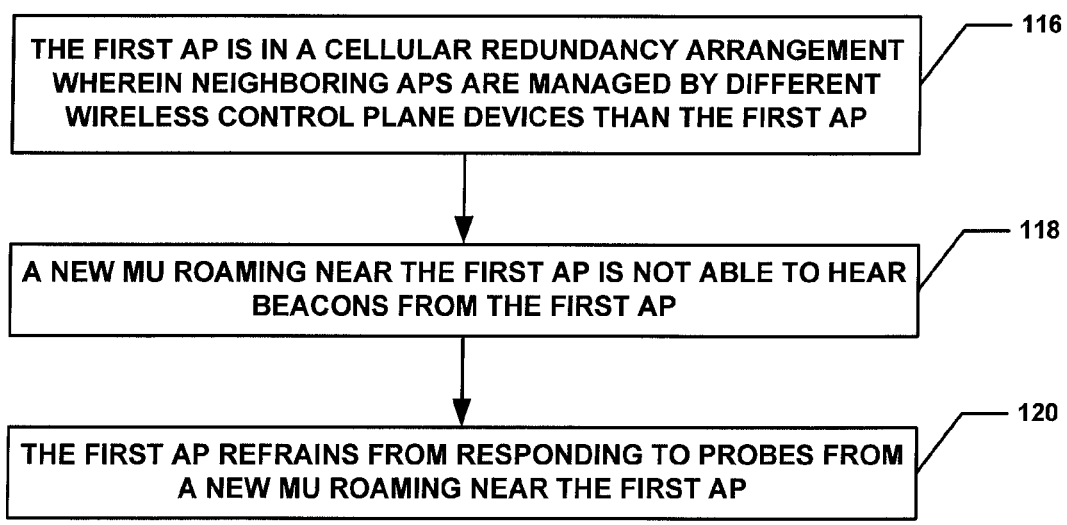

A flow chart of a particular embodiment of the presently disclosed method 100 is depicted in FIGS. 15A, 15B and 15C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 100 begins with processing block 102 which discloses detecting, by a first Access Point (AP) in a split-plane deployment, failure of a Wireless Control Plane (WCP) device. A WCP device can fail for any number of reasons, including a hardware failure, a software failure or an interconnect failure.

Processing block 104 states hiding an SSID of the first AP in beacons broadcast by the first AP. The SSID is the name of a WLAN. All devices on the WLAN employ the same SSID in order to communicate with each other.

Processing block 106 recites storing, in a cache of the first AP, information for existing Mobile Units (MUs) that dissociate after the detection of the failure of the WCP device. Processing block 108 discloses responding to probes from existing MUs. Processing block 110 states responding to probes from MUs having information in the cache, such that the first AP appears hidden from new MUs while being exposed to existing MUs.

Processing block 112 recites when an existing MU roams to a neighbor AP then roams back to the first AP, the first AP is visible to the MU due to the MU receiving responses from probes to the first AP. Processing block 114 discloses the first AP accepts the MU based on the information in the cache.

Processing continues with processing block 116 which states the first AP is in a cellular redundancy arrangement wherein neighboring APs are managed by different wireless control plane devices than the first AP.

Processing block 118 recites a new MU roaming near the first AP is not able to hear beacons from the first AP. When a new MU roams near the affected AP cell, it will not be able to hear beacons from the affected AP. When a new MU probes on the channel of the affected AP cell, it will not get any response from the affected AP.

Processing block 120 discloses the first AP refrains from responding to probes from a new MU roaming near the first AP. Because a new MU cannot detect the affected AP either from active or passive scanning it will not get attracted to this affected AP and will attempt to join only those AP(s) that are visible to it.

Figure 16:
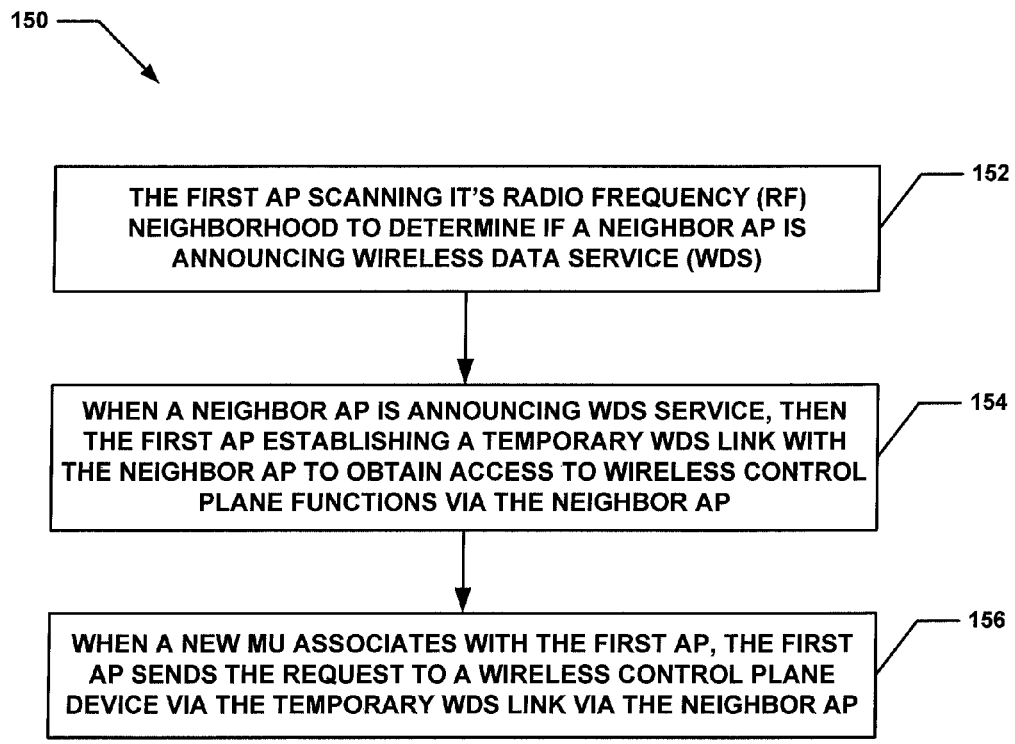
FIG. 16 is a flow diagram of a particular embodiment of a method for providing wireless control plane failover handling in a split-plane deployment wherein a Wireless Data Service (WDS) link is used.

Referring now to FIG. 16, an embodiment wherein an affected AP is able to provide service is shown. Method 150 starts with processing block 152 which states the first AP scanning it's Radio Frequency (RF) neighborhood to determine if a neighbor AP is announcing Wireless Data Service (WDS). When the WCP fails, the affected AP(s) continue to provide service to existing clients. The affected AP(s) stop announcing WDS service while the unaffected AP(s) continue to announce the WDS service. The affected AP(s) also scan their RF neighborhood to determine any neighbor AP(s) that are announcing the WDS service.

Processing block 154 discloses when a neighbor AP is announcing WDS service, then the first AP establishing a temporary WDS link with the neighbor AP to obtain access to Wireless Control Plane functions via the neighbor AP. Once a neighbor working AP is determined, the affected AP establishes a temporary WDS link with the working AP for obtaining access to the WCP functions via the working AP.

Processing block 156 states when a new MU associates with the first AP, the first AP sends the request to a Wireless Control Plane device via the temporary WDS link via the neighbor AP.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
  detecting, by a first Access Point (AP) in a split-plane deployment, failure of a Wireless Control Plane (WCP) device;
  hiding an SSID of said first AP in beacons broadcast by said first AP;
  storing, in a cache of said first AP, information for existing Mobile Units (MUs) that dissociate after the detection of said failure of said WCP device;
  responding to probes from existing MUs;
  responding to probes from MUs having information in the cache, such that said first AP appears hidden from new MUs while being exposed to existing MUs;
  wherein when an existing MU roams to a neighbor AP then roams back to said first AP, said first AP is visible to said MU due to said MU receiving responses from probes to said first AP; and
  wherein said first AP is in a cellular redundancy arrangement wherein neighboring APs are managed by different wireless control plane devices than said first AP.

2. The method of claim 1 wherein said first AP accepts said MU based on said information in said cache.

3. The method of claim 1 wherein a new MU roaming near said first AP is not able to hear beacons from said first AP.

4. The method of claim 1 wherein said first AP refrains from responding to probes from a new MU roaming near said first AP.

5. The method of claim 1 further comprising said first AP scanning it's Radio Frequency (RF) neighborhood to determine if a neighbor AP is announcing Wireless Data Service (WDS).

6. The method of claim 5 wherein when a neighbor AP is announcing WDS service, then said first AP establishing a temporary WDS link with said neighbor AP to obtain access to Wireless Control Plane functions via said neighbor AP.

7. The method of claim 6 wherein when a new MU associates with said first AP, said first AP sends the request to a Wireless Control Plane device via said temporary WDS link via said neighbor AP.

8. A non-transitory computer readable storage medium having computer readable code thereon for wireless control plane failover handling in a split-plane deployment, the medium including instructions in which a computer system performs operations comprising:
  detecting, by a first Access Point (AP) in a split-plane deployment, failure of a Wireless Control Plane (WCP) device;
  hiding an SSID of said first AP in beacons broadcast by said first AP;
  storing, in a cache of said first AP, information for existing Mobile Units (MUs) that dissociate after the detection of said failure of said WCP device;
  responding to probes from existing MUs; and
  responding to probes from MUs having information in the cache, such that said first AP appears hidden from new MUs while being exposed to existing MUs;
  wherein when an existing MU roams to a neighbor AP then roams back to said first AP, said first AP is visible to said MU due to said MU receiving responses from probes to said first AP; and
  wherein said first AP is in a cellular redundancy arrangement wherein neighboring APs are managed by different wireless control plane devices than said first AP.

9. The method of claim 8 wherein said first AP accepts said MU based on said information in said cache.

10. The method of claim 8 wherein a new MU roaming near said first AP is not able to hear beacons from said first AP.

11. The method of claim 8 wherein said first AP refrains from responding to probes from a new MU roaming near said first AP.

12. The method of claim 8 further comprising said first AP scanning it's Radio Frequency (RF) neighborhood to determine if a neighbor AP is announcing Wireless Data Service (WDS).

13. The method of claim 12 wherein when a neighbor AP is announcing WDS service, then said first AP establishing a temporary WDS link with said neighbor AP to obtain access to Wireless Control Plane functions via said neighbor AP.

14. The method of claim 13 wherein when a new MU associates with said first AP, said first AP sends the request to a Wireless Control Plane device via said temporary WDS link via said neighbor AP.

15. A first Access Point (AP) comprising:
- a memory;
- a processor;
- a communications interface;
- an interconnection mechanism coupling the memory, the processor and the communications interface; and
- wherein the memory is encoded with an application providing wireless control plane failover handling in a split-plane deployment, that when performed on the processor, provides a process for processing information, the process causing the first AP to perform the operations of:
- detecting, by said first AP in a split-plane deployment, failure of a Wireless Control Plane (WCP) device;
- hiding an SSID of said first AP in beacons broadcast by said first AP;
- storing, in a cache of said first AP, information for existing Mobile Units (MUs) that dissociate after the detection of said failure of said WCP device;
- responding to probes from existing MUs;
- responding to probes from MUs having information in the cache, such that said first AP appears hidden from new MUs while being exposed to existing MUs;
- wherein when an existing MU roams to a neighbor AP then roams back to said first AP, said first AP is visible to said MU due to said MU receiving responses from probes to said first AP and wherein said first AP accepts said MU based on said information in said cache; and
- wherein said first AP is in a cellular redundancy arrangement wherein neighboring APs are managed by different wireless control plane devices than said first AP.

16. The first AP of claim 15 further comprising said first AP scanning it's Radio Frequency (RF) neighborhood to determine if a neighbor AP is announcing Wireless Data Service (WDS), wherein when a neighbor AP is announcing WDS service, then said first AP establishing a temporary WDS link with said neighbor AP to obtain access to Wireless Control Plane functions via said neighbor AP and wherein when a new MU associates with said first AP, said first AP sends the request to a Wireless Control Plane device via said temporary WDS link via said neighbor AP.

* * * * *